Oct. 14, 1941.  T. A. BANNING, JR  2,258,876
TRAILER BRAKE AND THE LIKE
Filed June 21, 1939   3 Sheets-Sheet 2
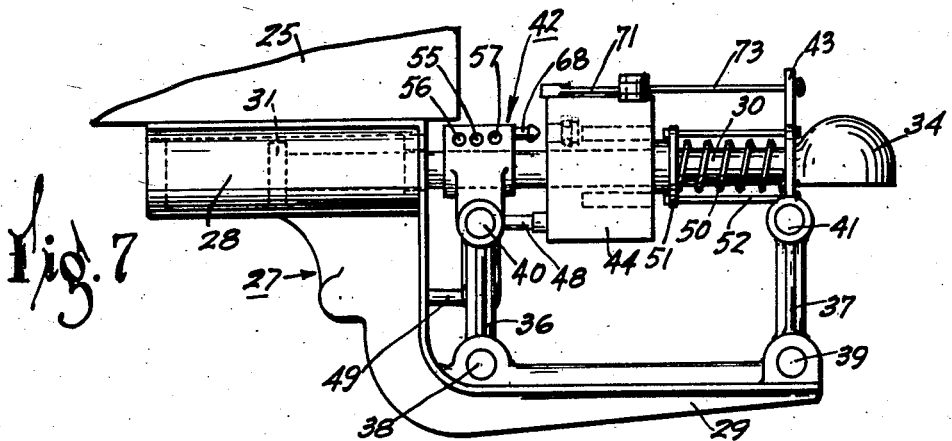
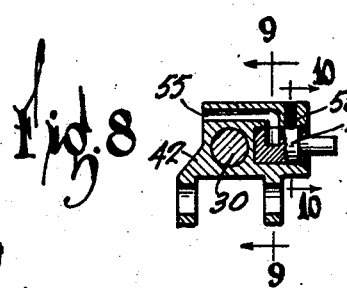
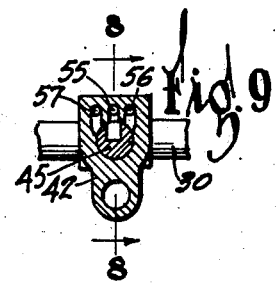
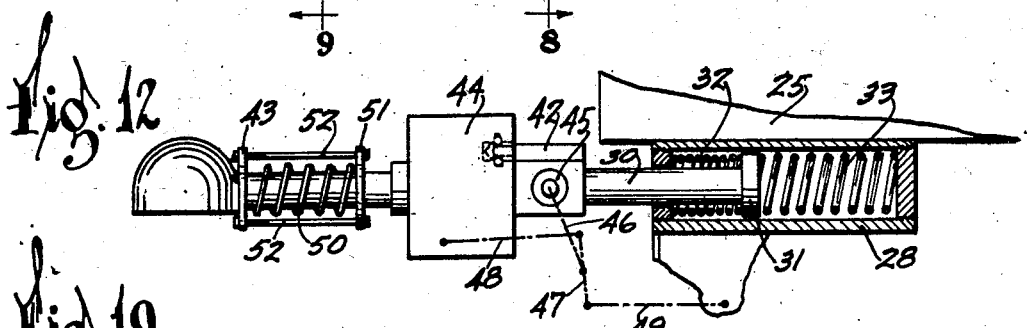
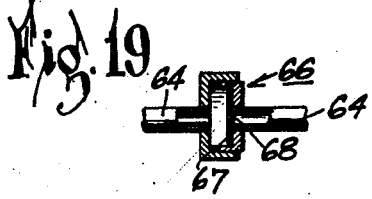
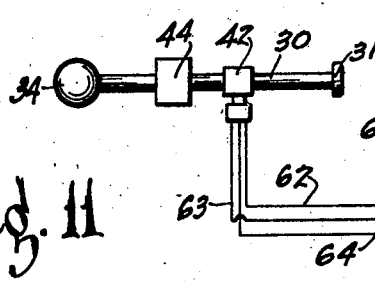
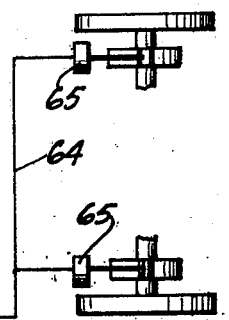
INVENTOR
Thomas A. Banning, Jr.
BY A. L. McGrady
ATTORNEY

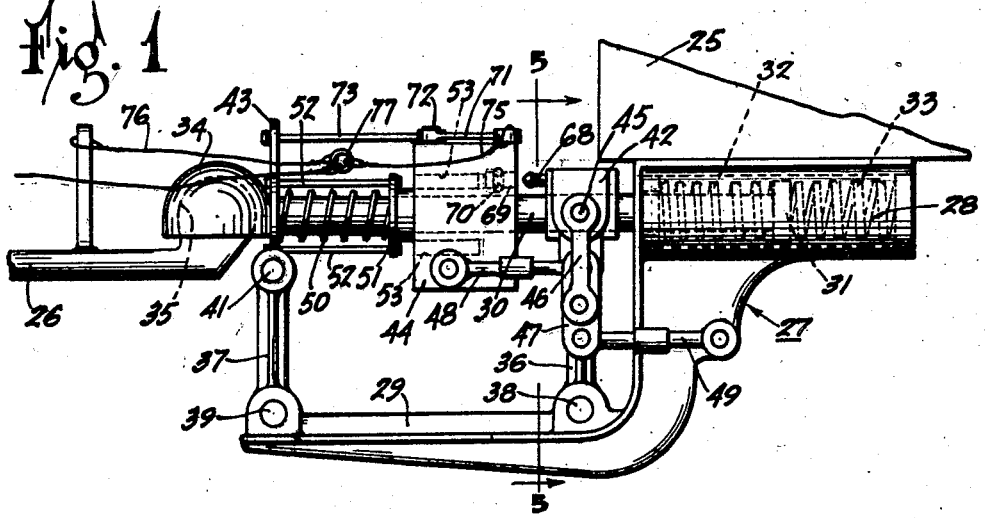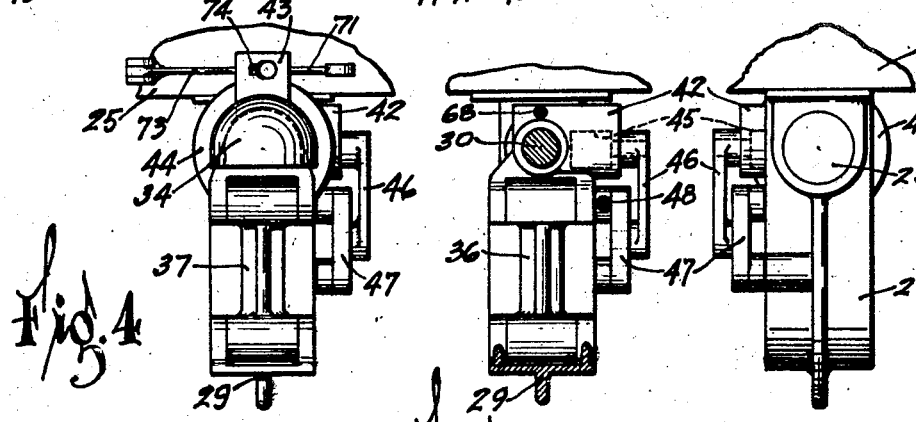

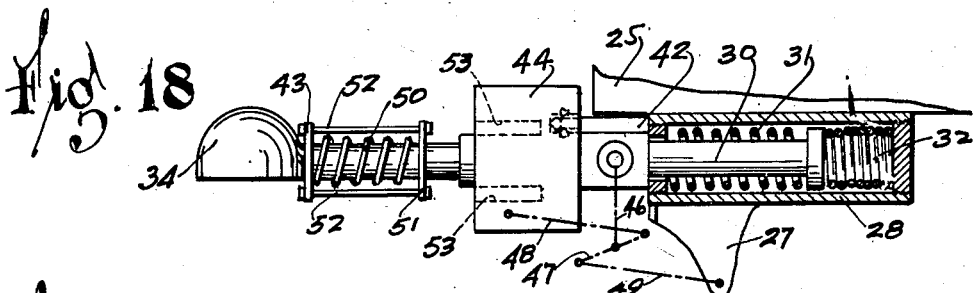
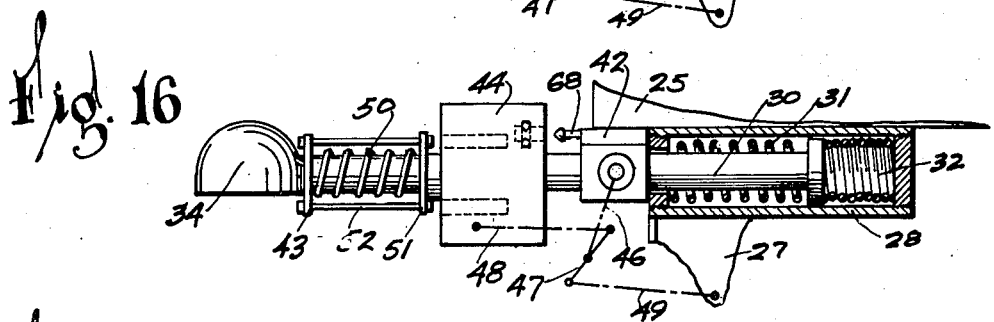
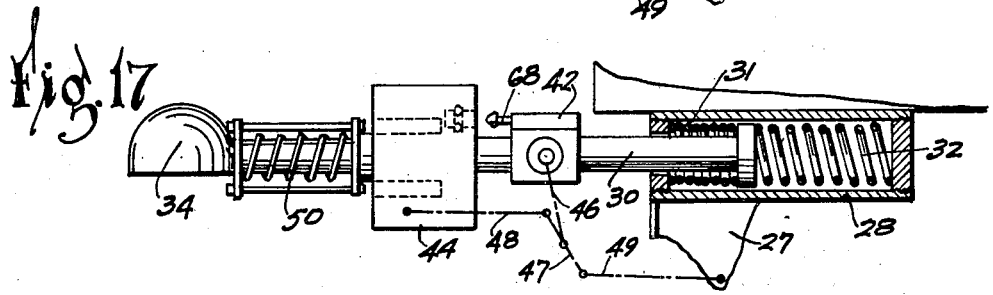
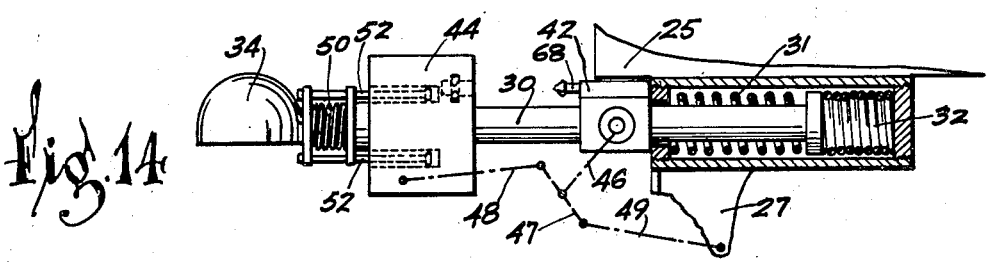
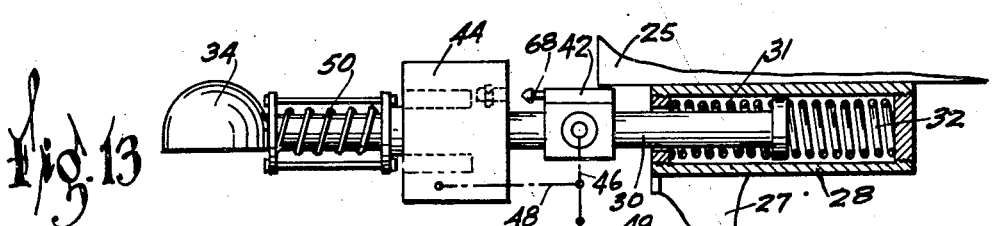
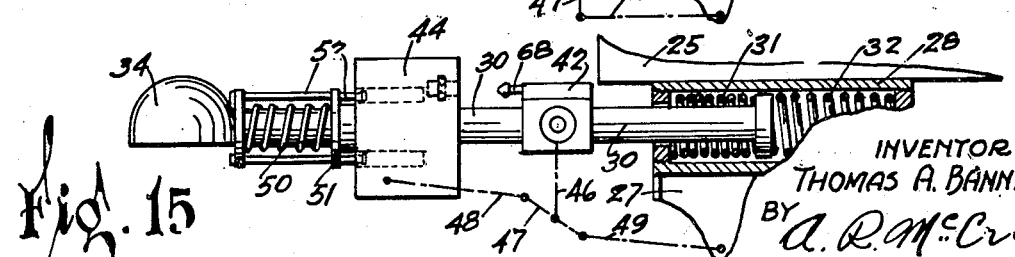

Patented Oct. 14, 1941

2,258,876

UNITED STATES PATENT OFFICE 2,258,876

TRAILER BRAKE AND THE LIKE

Thomas A. Banning, Jr., Chicago, Ill., assignor to Bendix Aviation Corporation, South Bend, Ind., a corporation of Delaware Application June 21, 1939, Serial No. 280,236

15 Claims. (Cl. 188—142)

This invention relates to improvements in trailer brakes and the like, that is, brakes for braking the trailer units which are drawn by tractor or motor car units. Brakes embodying the features herein disclosed may be used on trailers drawn by motor passenger cars, or the trailers drawn by truck tractor units, or in many other locations, and many other uses, which will presently appear.

One object of the invention is to provide a trailer brake of such construction and mode of operation that it shall be completely self-contained, in the sense that the braking functions thereof are performed independently of any connections to the braking mechanism of the tractor unit. In this connection it is an object of the invention to so arrange the trailer brake mechanism that its functions of setting and releasing the trailer brakes shall occur in proper harmony with the braking effects produced in the tractor unit, but without connections to the tractor unit, other than the necessary drawbar connection.

The braking action on the trailer unit is controlled by the over-riding or under-riding movements of the trailer unit as compared with the tractor unit; and it is a further object of the invention to so arrange the brake control for the trailer unit that various braking functions may be secured on the trailer unit merely by the over-riding and under-riding actions aforesaid.

A further object of the invention is to so arrange the parts that the setting of the brakes on the trailer unit may be effected by any suitable power carried by or available on the trailer unit, such as vacuum, air pressure, oil pressure, electromagnetic means, or other agencies; and the arrangements are such that the control thereof is effected by the over-riding or under-riding of the trailer unit with respect to the tractor unit, thereby controlling a suitable valve, or other control agency.

One object of the invention is to so arrange the parts that when the braking action is established on the tractor unit so that an over-riding action of the trailer unit commences, the control device will promptly cause the brakes of the trailer unit to be set, and the degree of such setting will depend on the amount and degree of the deceleration of the tractor unit. In connection with the foregoing, it is a further object to so arrange the parts that in case the deceleration of the tractor unit is thereafter reduced the control unit will cause a reduction of the braking action on the trailer unit. And a still further object in this connection is to so arrange the parts that when the tractor unit is again subjected to acceleration the braking action will be completely discontinued on the trailer unit so that the combination of tractor and trailer may again resume normal travel.

A further object of the invention is to so arrange the parts that in case of deceleration under certain conditions the braking action on the trailer unit will build up to an amount greater than necessary to produce the same degree of deceleration on the trailer unit as exists on the tractor, thereby causing the trailer unit to drag back on the tractor unit, and actually assist the deceleration of the tractor as well as the trailer. This feature is of especial value in connection with the braking of tractor-trailer combinations when descending hills or grades, as by means of this feature it is possible. to ensure that the trailer unit will even at such times trail in the best and proper manner, and will not tend to weave or swing sidewise on the down grade.

Another object of the invention is to provide an arrangement such that when it is desired to back the tractor against the trailer this can be done without setting the trailer brakes.

A further feature of the invention relates to the provision of an arrangement such that in case of emergency the driver may himself cause the trailer brakes to be set, independently of any automatic action due to the trailer brake control devices.

A further feature of the invention relates to the provision of means whereby in case of a break occurring in the draw-bar, so that the trailer becomes detached from the tractor unit, the brakes of the trailer unit will be automatically set, to thereby hold the trailer unit against movement. This feature is of especial value as a protection against accidents on up grades when the draw-bar mechanism is being subjected to abnormal stresses.

Other objects and uses of the invention will appear from a detailed description of the same, which consists in the features of construction, and combinations of parts, hereinafter described and claimed.

In the drawings:

Figure 1 shows a side elevation of a draw-bar and brake control device embodying the features of the present invention, the parts standing in their normal positions;

Figure 2 shows a bottom plan view corresponding to Figure 1;

Figure 3 shows a top plan view corresponding to Figure 1;

Figure 4 shows a front elevation corresponding to Figures 1, 2, 3 and 5;

Figure 5 shows a section on the line 5—5 of Figure 1, looking in the direction of the arrows;

Figure 6 shows a back end elevation corresponding to Figures 1 and 3;

Figure 7 shows a side elevation looking at the side opposite to that of Figure 1;

Figure 8 shows a detailed section through the valve itself, being taken on the line 8—8 of Figure 9, looking in the direction of the arrows;

Figure 9 shows a section on the line 9—9 of Figure 8, looking in the direction of the arrows;

Figure 10 shows a section on the line 10—10 of Figure 8, looking in the direction of the arrows;

Figure 11 shows a typical piping hook-up for an arrangement embodying the control devices herein set forth;

Figure 12 shows more or less diagrammatically the relative positions of the principal parts of the control device when the tractor is accelerating normally;

Figure 13 shows a diagram similar to that of Figure 12 but when the tractor and trailer are both at rest, and the control parts are in normal positions;

Figure 14 shows a view similar to that of Figure 12 but with the tractor and trailer travelling on a level, and under the condition that the tractor brakes are set heavily for rapid deceleration;

Figure 15 shows a view similar to that of Figure 14, but showing the correction of braking action which will occur when the trailer begins to drag back on the tractor unit;

Figure 16 shows a view similar to that of Figure 13 but under the condition that the trailer unit has begun to ride up on the tractor unit to increase the braking action;

Figure 17 shows a view similar to that of Figure 16, but under the condition that the tractor unit has again begun to exert draw on the draw bar to accelerate the units;

Figure 18 shows a view similar to that of Figure 13, but under the condition that the tractor unit is backed slowly against the trailer to back the same normally; and Figure 19 shows a fragmentary section through a simple form of metering nozzle for limiting the rate of flow of oil through the oil line.

Referring first to Figures 1 to 10 inclusive, which show the construction of a typical form of draw bar and control device embodying the features of the present invention, the front end of the trailer unit is shown at 25, and the rear portion of the tractor unit or a part connected thereto, is shown at 26. There is a suitable bracket 27 attached to the front end of the trailer unit, the same including a cylindrical portion 28 wherein suitable springs are housed, and a downwardly extending bracket proper 29. A draw bar 30 works in the cylindrical portion 28, and has an end flange 31, so that the two springs 32 and 33 may work against this end flange and against the ends of the cylindrical portion, as evident from the various figures. These springs normally hold the draw bar in the central position shown in Figure 13, and endwise movement in either direction is resisted by one or the other of these springs. The outer end of the draw bar proper carries the cup shaped coupling 34 which is adapted to receive the ball 35 carried by the tractor unit, in the well understood manner.

It will be understood that forces existing between the tractor and trailer units will be communicated through this draw bar, and will result in shifting of the draw bar either into or outwardly from the cylindrical portion 28 according to the nature of such forces.

The bracket proper 29 carries the two links 36 and 37 pivoted at the points 38 and 39, and the upper ends of these links are likewise pivoted to the draw bar proper or to elements connected thereto, at the points 40 and 41. In the arrangement shown these pivotal points 40 and 41 are effected to the block 42 and to the plate 43 carried by the draw bar. The arrangement is such that the back and forth movements of the draw bar are permitted with a right line movement, and without friction on the cylindrical portion 28.

Slidably mounted on the draw bar 30 is the inertia or momentum block 44. The block 42 on the draw bar carries the plug valve 45 which can be rocked through approximately forty-five degrees of movement in either direction, and the stem of this plug valve carries the crank arm 46. This crank arm in turn carries the lever member 47 which can rock with respect to the crank arm; and upper and lower links 48 and 49 connect the upper and lower ends of this lever member with the momentum or inertia block 44 and with the bracket 27, respectively.

It will now be evident that the rocking of the valve in one direction or the other will depend on the movements of the momentum or inertia block 44 and the movements of the draw bar 30, with respect to the bracket, which, in turn, is carried by the trailer unit. Analyzing this still further, the following appears; in case of forward movement of the momentum block with shift of the draw bar we get movements tending to rock the valve clockwise (when viewed as in Figure 1). Rocking in this clockwise direction may be considered as valve opening movement, and rocking in the counterclockwise direction when viewed as in Figure 1 may be considered as valve closing or releasing movement.

It will be still further evident that pulling out movement of the draw bar 30 tends also to cause the valve to rock counterclockwise, and that in push of the draw bar tends to rock the valve clockwise. Thus it is evident that over-running movements of the trailer with respect to the tractor unit tend to rock the valve clockwise, and thereby supplement the action of the momentum block, for valve opening movements to set the brakes; and that on the contrary, the pulling of the trailer away from the tractor unit, and/or backward movements of the momentum block tend to rock the valve counterclockwise. It is also evident that these two tendencies may act either singly or cumulatively; or in some cases they may oppose each other so that the valve will assume some intermediate position dictated by the net results of both of these actions.

Since the momentum action of the block 44 should be made effective in proportion to the decelerating tendency, I have provided the springs 50 around the draw bar and in advance of the momentum block. There is a plate 51 slidably mounted on the draw bar between the momentum block and the spring 50, and the pins 52 guide this plate 51 in its movements. These pins are fixed to the end plate 43, and the momentum block is provided with suitable inwardly extending holes 53 to receive the pins when the momentum block moves forwardly due to deceleration. With this arrangement it is evident that the position of the block 44 during deceleration will depend on the rate of the deceleration, as desired.

The plug valve 45 has the central recess 54 which communicates with the central port 55 at all times, and the port 55 connects with the brake cylinder of the trailer brakes; and at the sides of the central port 55 are the ports 56 and 57 which lead to the source of pressure oil and to the return line, respectively. If desired, a "click" 58 may be provided to normally hold the valve plug in the central or neutral position, but such position is dictated by the linkage in any case.

Reference to Figure 11 shows a simple form of piping arrangement for this brake scheme. A suitable pump 59 (driven, if desired by the back and forth movements of the draw bar) takes oil from the return tank 60 and delivers it under pressure to the pressure tank 61 where it is stored ready for use. The line 62 extends from the pressure tank to the port 56; and the line 63 extends from the port 57 to the return tank 60; and the line 64 extends from the port 55 to the brake cylinder 65 of the trailer unit. If desired, the metering port unit 66 may be placed in the line 64 for reasons to be presently explained. This metering port unit is shown in Figure 19, and it includes the orifice plate 67 having an orifice 68 of relatively small size so that the rate of oil flow therethrough will be restricted, but which does not prevent the building up of oil pressure on the brakes to the amount dictated by the pressure of the supply.

With the explanation thus far completed, the following comments on possible operations are made:

When the parts are in normal position they stand as shown in Figure 1, the springs 32 and 33 having centered the draw bar, and the momentum block standing just forward of the extended spring 50. Now assume that the tractor is accelerated to start up the combination tractor and trailer units. The spring 32 will be compressed and the momentum block will shift towards the rear against the block 42. Both these actions are cumulative to cause the valve to rock counterclockwise with consequent full opening of the valve to the discharge position. Thus the brakes are full released, if they were not released prior to the commencement of acceleration. (See Figure 17 for this condition.)

If a running condition is then assumed, so that the draw bar is still extended, but to a lesser extent, the spring 32 will relax to some extent, thereby allowing the draw bar to shift back somewhat, and since there is neither acceleration or deceleration, the block 44 will stand in its normal position, and the valve will assume a central position, such as shown in Figure 15.

Now, if a large deceleration is generated in the tractor unit by setting its brakes, this deceleration will be communicated to the trailer unit, and the momentum block 44 will shift forwardly the full extent, and also the spring 33 will be compressed by backward movement of the draw bar, so that a cumulative action will be created tending to cause a full vale movement in clockwise direction, and production of heavy braking action. This condition is shown in Figure 14. The result will be that braking action in the trailer will be rapidly built up until presently the braking action in the trailer will actually exceed that being exerted in the tractor unit, so that the trailer will begin to hold back on the tractor; and as a result thereof, a condition such as shown in Figure 15 will be created, so that further increase of braking effort of the trailer is discontinued, and the trailer will thereafter exert a braking action such as to continue to hold back on the tractor, but with a uniform deceleration.

If now the tractor is again put under power, to create a pulling tendency, the draw bar will be drawn out as shown in Figure 17 with consequent reversal of valve position, and the valve will rock counterclockwise to the release position, and release the trailer brakes.

If we assume a condition of descending a hill or grade at uniform speed, with braking action on both tractor and trailer, we shall have a condition such as shown in Figure 16; and as we approach the lower end of such grade and reapply power to the tractor unit, we shall again accelerate the tractor, and cause the brakes to be released according to the showing of Figure 17.

If we assume the condition of back the tractor unit against the trailer unit we find the following actions: If the tractor unit should be easily backed against the trailer unit, as for a normal backing operation, the draw bar will be forced back against the spring 32 as shown in Figure 16 thereby tending to move the valve in the clockwise direction; however, the block 44 will move rearward along with the drawbar, this movement of the block 44 acting to offset or counteract the effect caused by the rearward movement of the drawbar, and to prevent the trailer brakes from being applied. If the tractor unit should be suddenly driven hard against the trailer unit, as in attempting to drive the combination out of a rut or the like, the momentum block 44 would be suddenly thrown against the spring 50, and the rebound of the momentum block would carry it backwardly against the block 42. Continued backing would again tend to move the momentum block towards the tractor unit with consequent setting of the brakes on the trailer. To prevent this contingency I have provided the pin 68 on the block 42, which pin has a slightly enlarged head, and there is a companion recess 69 in the momentum block wherein there is the round coiled spring 70 in position to receive the enlarged head of the pin 68, thereby locking the momentum block lightly to the block 42. Thereby the momentum block is held lightly during such an operation, and it will not return to the brake setting position until again forced away from the pin 68 by a sufficient jar. It is to be noted that during the first portion of these operations the momentary throwing of the momentum block towards the spring 50 will not cause the brakes to be set, for the reason that this action is of very short duration, and for the further reason that the metering orifice in the metering plate 67 will prevent a too fast supply of oil to the trailer brake cylinders.

In order to make it possible for the driver of the tractor unit to set the brakes on the trailer if he so desires, I have shown the following devices;

There is a bell-crank 71 pivoted to the momentum block at the point 72. A link 73 connects to one arm of this bell-crank and passes through an opening in a plate 74 (or 43) on the end of the bracket, and the end of the link is enlarged so that it will take against this plate and hold therein. The other end of the bell-crank is connected to a cord 75 which extends forward to the driver's cab in the tractor unit, so that when he so desires the driver may pull this cord and thereby draw the momentum block 44 forwardly, thereby rocking the valve in the valve setting position. The bell-crank is so proportioned that by a complete pull the bell-crank will turn around far enough to carry the link 73 past dead-center so that the momentum block will then be held against returning movement, and the brakes of the trailer will remain set.

If desired another cord 76 may be connected to the cord 75, as by means of the ring 77, the cord 76 connecting to the tractor unit itself. With this arrangement, in case of separation of the tractor and trailer units, as in case of breakage of the draw bar connection, the cord 76 will serve to pull the bell-crank around to the brake setting position, where it will remain due to the fact that the bell-crank is beyond dead center, and the cord 76 will then break off, leaving the tractor free of the trailer, and the brakes on the trailer will remain in set condition.

While I have herein shown and described only a single embodiment of the features of my present invention, still I do not intend to limit myself thereto, except as I may do so in the claims to follow.

I claim:

1. The combination with a tractor unit having power drive and braking mechanisms and a trailer unit having braking mechanisms thereon including a source of fluid pressure supply on said trailer unit for said trailer braking mechanisms, of means to automatically control actuation of said trailer braking mechanisms by the power of said fluid pressure supply and according to running and accelerating and decelerating conditions of said tractor unit, said means comprising a draw bar on the trailer unit, a connection between said draw bar and the trailer unit permitting longitudinal movement of the draw bar with respect to the trailer unit, spring means tending to centralize the draw bar in such longitudinal movement, a control valve carrried by the draw bar, a momentum body carried by the draw bar and longitudinally movable with respect thereto, spring means to resist advancing movements of the momentum body on the draw bar, differential connections between the control valve, momentum body, and trailer unit whereby movements of the draw bar with respect to the trailer unit tend to cause valve movements in corresponding directions, and whereby movements of the momentum body with respect to the draw bar tend to cause valve movements corresponding thereto, a fluid pressure connection to the valve, a fluid release connection from the valve, and a connection from the valve to the braking mechanism of the trailer unit.

2. The combination with a tractor unit having power drive and braking mechanisms and a trailer unit having braking mechanisms thereon including a source of braking fluid power supply on said trailer unit for said trailer braking mechanism, of means to automatically control actuation of said trailer braking mechanisms by the power of said fluid power supply and according to running and accelerating and decelerating conditions of said tractor unit, said means comprising a draw bar longitudinally mounted on the trailer unit, spring means on the trailer unit tending to centralize said draw bar in its longitudinal movements, a control valve carried by said draw bar and having a rocking valve member, together with ports for fluid power supply and release and for the trailer braking mechanism, a momentum body carried by the draw bar and longitudinally movable thereof, spring means tending to resist advancing movements of said momentum body with respect to the draw bar, a differential element in connection with the rocking valve member, connections between the momentum body and said differential element, and other connections between the differential element and the trailer unit, fluid power supply connections between the source of fluid power supply and the fluid power supply port of the valve member, and fluid power connections between the trailer brake mechanism and the corresponding port of the valve member.

3. The combination with a tractor unit having power drive and braking mechanisms and a trailer unit having braking mechanisms thereon including a source of braking fluid power supply on said trailer unit for said trailer braking mechanism, of means to automatically control actuation of said trailer braking mechanism by the power of said fluid power supply and according to running and accelerating and decelerating conditions of said tractor unit, said means including a draw bar longitudinally movably mounted on the trailer unit, spring means tending to centralize said draw bar in its longitudinal movements aforesaid, a momentum body longitudinally movable with respect to the draw bar, spring means tending to resist advancing movements of said momentum body as aforesaid, valve means connected to the draw bar and movable therewith, and including a movable valve member, and differential connections between the said valve member, said momentum body and the trailer unit, whereby the valving condition of the movable valve member is at all times dependent on the relative positions of the draw bar and momentum body with respect to the trailer unit, and suitable fluid connections between the valve means and the source of fluid power supply and the trailer braking mechanism.

4. The combination with a tractor unit having power drive and braking mechanisms and a trailer unit having braking mechanisms thereon including a source of braking fluid power supply on said trailer unit for said trailer braking mechanism, of means to automatically control actuation of said trailer braking mechanism by the power of said power fluid power supply and according to running and accelerating and decelerating conditions of said tractor unit, said means including a draw bar element longitudinally movably mounted on the trailer unit, means tending to centralize said draw bar element in its longitudinal movements aftersaid, a momentum body in connection with said draw bar element, means tending to resist advancing movements of said momentum body in amount proportional to the advancing movements thereof, valve means in connection with the draw bar element and movable in connection with draw bar element movements, and including a valve member, and differential connections between the valve member, the momentum body, and the trailer unit effectively to ensure valve member positioning according to the relative positions of the draw bar element, the momentum body, and the trailer unit, fluid power supply and release connections to the valve means, and fluid power connections between the valve means and the trailer braking mechanism.

5. The combination with a tractor unit having power drive and braking mechanisms and a trailer unit having braking mechanisms thereon including a source of braking fluid power supply on said trailer unit for said trailer braking mechanism, of means to automatically control actuation of said trailer braking mechanism by the power of said power fluid suppl: and according to running and accelerating and decelerating conditions of said tractor unit, said means including a draw bar element longitudinally movably mounted on the trailer unit, a momentum body in connection with the trailer unit, valve means in connection with the draw bar element and movable in connection with draw bar element movements, and including a valve member, and differential connections between the valve member, the momentum body, and the trailer unit effectively to ensure valve member positioning according to relative positions of the draw bar element, the momentum body, and the trailer unit, fluid power supply and release connections to the valve means, and fluid power connections between the valve means and the trailer braking mechanism.

6. The combination with a tractor unit having power drive and braking mechanisms and a trailer unit having braking mechanisms thereon including a source of braking power fluid supply on said trailer unit for said trailer braking mechanism, of means to automatically control actuation of said trailer braking mechanism by the power of said power fluid supply and according to running and accelerating and decelerating conditions of said tractor unit, said means including a draw bar element longitudinally movably mounted on the trailer unit, a momentum body in connection with the trailer unit, valve means in connection with the draw bar element and movable in connection with the draw bar element movements, and including a valve member, differential connections between the valve member, the momentum body, and the trailer unit effectively to ensure valve member positioning according to relative positions of the draw bar element, the momentum body, and the trailer unit, fluid power supply and release connections to the valve means, and fluid power connections between the valve means and the trailer braking mechanism, together with a mechanical connection between the valve member and the tractor unit effectively to set said valve member into brake setting position when the tractor unit moves away from the trailer unit more than a predetermined distance.

7. The combination with a tractor unit having power drive and braking mechanisms and a trailer unit having braking mechanisms thereon including a source of braking power fluid supply on said trailer unit for said trailer braking mechanism, of means to automatically control actuation of said trailer braking mechanism by the power of said power fluid supply and according to running and accelerating and decelerating conditions of said tractor unit, said means including a valve means having a valve memoer, fluid power supply and release connections to the valve means, fluid power connections between the valve means and the trailer braking mechanism, means to move the valve member aforesaid to positions according to momentary accelerations and decelerations of the trailer unit and according to momentary relative positions of the tractor and trailer units, together with independent connections between the valve member and the tractor unit effectively to ensure brake setting action of the trailer unit when tractor and trailer units are separated more than a predetermined distance.

8. The combination with a tractor unit having power drive and braking mechanisms and a trailer unit having braking mechanisms thereon including a source of braking power fluid supply on said trailer unit for said trailer braking mechanism, of means to automatically control actuation of said trailer braking mechanism by the power of said power fluid supply and according to running and accelerating and decelerating conditions of said tractor unit, said means including a valve means having a valve member, fluid power supply and release connections to the valve means, fluid power connections between the valve means and the trailer braking mechanism, means to move the valve member aforesaid to positions according to momentary accelerations and decelerations of the trailer unit and according to momentary relative positions of the tractor and trailer units, together with a connection from said valve member to a location convenient to the driver of the tractor, effectively to permit operation of the valve member for brake setting operations on the trailer unit independently of conditions of acceleration and deceleration of the trailer unit and conditions of position of trailer and tractor units relatively to each other.

9. The combination with a tractor unit having power drive and braking mechanisms and a trailer unit having braking mechanisms thereon including a source of braking power liquid supply on said trailer unit for said trailer braking mechanism, of means to automatically control actuation of said trailer braking mechanism by the power of said power liquid supply and according to running and accelerating and decelerating conditions of said tractor unit, said means including a valve means having a valve member, liquid power supply and release connections to the valve means, liquid power connections between the valve means and the trailer braking mechanism, and means to move the valve member aforesaid to positions according to momentary accelerations and decelerations of the trailer unit and according to momentary relative positions of the tractor and trailer units.

10. In a tractor and trailer vehicle combination having a connecting element between the two vehicles, means for actuating the trailer brakes comprising a source of fluid, a pump for maintaining the fluid under pressure, a valve for connecting and disconnecting the pressure fluid from the trailer brakes, means for controlling the actuation of the valve according to the relative positions of the tractor and trailer, and a momentum device for preventing operation of the valve during backward movement of the vehicle combination.

11. For use with a towing vehicle, a trailer having brakes, a brake actuator, a valve for controlling the brake actuator, a momentum device in part controlling the operation of the said valve, and means for in part controlling the operation of the said valve according to the relative distances of the trailer from the towing vehicle.

12. In a tractor and trailer vehicle combination, a braking system for the trailer comprising brake applying elements, hydraulic actuators for moving the said elements to apply the brakes, a liquid reservoir, a pump connected to the said liquid reservoir and also to the hydraulic actuators for receiving liquid from the reservoir and transmitting it under pressure to the hydraulic actuators, a valve for connecting the pressure liquid from the pump alternately to the reservoir and to the hydraulic actuators, and means for controlling said valve according to the momentary conditions of separation between the tractor and trailer units.

13. In a tractor and trailer vehicle combination having a drawbar connecting the two vehicles, a braking system for the trailer comprising brake applying elements, hydraulic actuators for moving the said elements to apply the brakes, a liquid reservoir, a pump connected to the said liquid reservoir and also to the hydraulic actuators for receiving liquid from the reservoir and transmitting it under pressure to the hydraulic actuators, a valve for connecting the pressure liquid from the pump alternately to the reservoir and to the hydraulic actuators, said valve being secured to the said drawbar, and a control element for opening and closing the valve, said control element being connected to the trailer vehicle.

14. In a tractor and trailer vehicle combination having a drawbar connecting the two vehicles, the said drawbar being fixed to the tractor vehicle and being capable of movement relative to the trailer vehicle, a braking system for the trailer comprising brake applying elements, hydraulic actuators for moving the said elements to apply the brakes, a liquid reservoir, a pump connected to the said liquid reservoir and also to the hydraulic actuators for receiving liquid from the reservoir and transmitting it under pressure to the hydraulic actuators, a valve for connecting the pressure liquid from the pump alternately to the reservoir and to the hydraulic actuators, said valve being secured to the said drawbar, and a control element for opening and closing the valve, said control element being connected to the trailer vehicle.

15. For use with a tractor and trailer vehicle combination, brakes for the trailer, fluid pressure means for actuating the said brakes, means on the trailer vehicle for creating the fluid pressure necessary to operate the aforesaid means, a valve for controlling the admission of pressure fluid from the pressure creating means to the brake actuating means, a control element for the valve which operates the valve according to the distance between the tractor and trailer, and a momentum device for at times preventing the control element from operating the valve.

THOS. A. BANNING, JR.